US012726500B2

(12) United States Patent
Livingston

(10) Patent No.: US 12,726,500 B2
(45) Date of Patent: Sep. 1, 2026

(54) SYSTEM AND METHOD FOR ENHANCING RELIABILITY AND TRUSTWORTHINESS IN CYBER-PHYSICAL SYSTEMS USING ARTIFICIAL INTELLIGENCE

(71) Applicant: Aiden Livingston, Alexandria, VA (US)

(72) Inventor: Aiden Livingston, Alexandria, VA (US)

( * ) Notice: Subject to any disclaimer, the term of this patent is extended or adjusted under 35 U.S.C. 154(b) by 67 days.

(21) Appl. No.: 18/795,075

(22) Filed: Aug. 5, 2024

(65) Prior Publication Data

US 2025/0350617 A1 Nov. 13, 2025

Related U.S. Application Data

(60) Provisional application No. 63/644,034, filed on May 8, 2024.

(51) Int. Cl.

*H04L 9/40* (2022.01)
*G06F 11/30* (2006.01)
*G06F 11/32* (2006.01)
*H04L 41/16* (2022.01)

(52) U.S. Cl.

CPC ...... *H04L 63/1425* (2013.01); *G06F 11/3006* (2013.01); *G06F 11/3058* (2013.01); *G06F 11/327* (2013.01); *H04L 41/16* (2013.01)

(58) Field of Classification Search

CPC .. H04L 63/1425; H04L 41/16; G06F 11/3006; G06F 11/3058; G06F 11/327
See application file for complete search history.

(56) References Cited

U.S. PATENT DOCUMENTS

| | | | | |
|---|---|---|---|---|
| 11,783,233 | B1 * | 10/2023 | Kudli | G06N 20/00 706/12 |
| 2020/0304304 | A1 * | 9/2020 | Yankovskiy | H04L 9/0897 |
| 2021/0279618 | A1 * | 9/2021 | Wang | G06N 3/09 |

(Continued)

OTHER PUBLICATIONS

Ahmad Alzahrani et al., “Improve Wireless Medical Cyber-Physical System (IWMCPS) Based on Machine Learning,” 2023, pp. 1-20. (Year: 2023).*

(Continued)

*Primary Examiner* — Luu T Pham
*Assistant Examiner* — Canh Le
(74) *Attorney, Agent, or Firm* — Robert Brownstein

(57) ABSTRACT

A system and method for enhancing reliability and trustworthiness in cyber-physical systems using artificial intelligence are disclosed. The system comprises a plurality of sensors for collecting real-time data, a data processing unit that analyzes the data using machine learning models to identify patterns and anomalies, and a communication interface for transmitting recommendations based on the analysis. The machine learning models include an adversarial random forest (ARF) model and a probabilistic circuit model, and the analysis results are cross-validated across the collected data to verify accuracy and reliability. The method involves collecting data, analyzing it using the machine learning models, cross-validating the results, generating recommendations, and displaying them to an end-user. The invention provides a novel approach for enhancing the reliability and transparency of AI-driven cyber-physical systems.

20 Claims, 4 Drawing Sheets

(56) References Cited

U.S. PATENT DOCUMENTS

2021/0342743 A1* 11/2021 Woolf .................. G06F 16/245
2022/0141811 A1* 5/2022 Kadota .................. H04W 4/38 370/330
2022/0270183 A1* 8/2022 Menon ............ G06Q 10/06393
2023/0316370 A1* 10/2023 Kini ..................... G06F 3/0482 705/26.7
2023/0412685 A1* 12/2023 Baird ..................... H04L 67/12
2024/0004749 A1* 1/2024 Zhang ................ G06F 11/3058
2024/0247967 A1* 7/2024 Klicpera ................ G01F 25/10
2024/0378263 A1* 11/2024 Liu ...................... G06F 11/079
2024/0394269 A1* 11/2024 Nam ........................ G06N 7/01
2025/0030709 A1* 1/2025 Tian .................... H04L 63/1416
2025/0047702 A1* 2/2025 Formicola ........... H04L 63/1433
2025/0307694 A1* 10/2025 Mahishi ................ G06N 20/00
2025/0333931 A1* 10/2025 Gorman .................... G06T 7/70
2025/0342386 A1* 11/2025 Delmonico ............ G08B 21/10
2025/0342427 A1* 11/2025 Guha Majumder ......................... G06Q 30/0202

OTHER PUBLICATIONS

Ibrahim Kok et al., Explainable Artificial Intelligence (XAI) for Internet of Things: a Survey, 2023, pp. 1-16. (Year: 2023).*

* cited by examiner $$p_v(x) := f_v(x) \text{ if v is an input node,}$$ 302

$$p_v(x) := \sum_{c \in ch(v)} w_{v,c}\, p_c(x) \text{ if v is a sum node, and}$$ 304

$$p_v(x) := \prod_{c \in ch(v)} p_c(x) \text{ if v is a product node,}$$ 306

FIG. 3

SYSTEM AND METHOD FOR ENHANCING RELIABILITY AND TRUSTWORTHINESS IN CYBER-PHYSICAL SYSTEMS USING ARTIFICIAL INTELLIGENCE

BACKGROUND

Field of the Invention

The present invention relates generally to the field of artificial intelligence systems, and more specifically to algorithms that enhance trust, accuracy, and security in cyber-physical systems through physical verification of control systems using the combination of artificial intelligence and Internet of Things (IoT) physical sensors.

Description of the Related Art

The integration of artificial intelligence (AI) with Internet of Things (IoT) devices and systems in critical applications, such as autonomous vehicles, critical infrastructure monitoring, and manufacturing, demands high reliability and trustworthiness. However, current systems often lack the necessary redundancy and robustness, leading to mistrust and slow adoption of AI technologies in these domains.

Cyber-physical systems, which integrate computational and physical processes, are particularly vulnerable to failures and attacks. As noted in U.S. Pat. No. 10,417,425, "Secured cyber-physical systems," such systems include mechanical apparatuses with mechanical inputs or outputs, and controllers that control the operations of the mechanical apparatuses. The '425 patent discloses methods for inhibiting computing-based attacks on cyber-physical systems by causing resets and determining post-reset states based on the mechanical attributes of the system. While this provides a level of security, it does not address the need for enhanced reliability and accuracy in the AI-driven decision-making processes of these systems.

Other prior art solutions have attempted to improve the trustworthiness of AI systems through various means. For example, some have proposed the use of adversarial machine learning techniques to make AI models more robust to malicious inputs. Others have suggested the incorporation of explainable AI methods to make the decision-making processes of these systems more transparent and interpretable. However, these approaches do not directly address the need for physical verification of the data inputs and outputs of AI systems in cyber-physical applications.

Therefore, there remains a need for an AI-driven system that can enhance the reliability and accuracy of cyber-physical systems by integrating and verifying signals from multiple sensors in real-time. Such a system would increase trust in AI technologies and accelerate their adoption in critical applications where safety and security are paramount.

SUMMARY

The present invention is directed to a system and method for enhancing reliability and trustworthiness in cyber-physical systems using artificial intelligence. The system comprises a plurality of sensors configured to collect real-time data from an environment or system, a data processing unit that analyzes the collected data using machine learning models to identify patterns and anomalies, and a communication interface for transmitting historical trends and recommendations based on the analysis to an end-user.

In one embodiment, the plurality of sensors includes at least two sensor types selected from vibration sensors, thermal sensors, acoustic sensors, and environmental sensors. The data processing unit receives the collected real-time data from the sensors and analyzes it using a plurality of machine learning models, including an adversarial random forest (ARF) model and a probabilistic circuit model. The analysis results are cross-validated across the collected data from the different sensors to verify accuracy and reliability. Based on the cross-validated analysis, the system generates recommendations for improving the operation of the cyber-physical system, which are transmitted to a user interface for presentation to an end-user.

In another embodiment, the data processing unit 130 determines a trust score indicating the level of reliability and trustworthiness of the cyber-physical system based on the cross-validated analysis. This trust score is tracked over time and visualized for the end-user. The system may also identify sensors providing inaccurate or unreliable data and recommend maintenance or replacement.

The method of the invention involves collecting real-time data from an environment or system using a plurality of sensors, analyzing the data using machine learning models to identify patterns and anomalies, cross-validating the analysis results across the sensor data, generating recommendations based on the analysis, and displaying the recommendations to an end-user via a user interface. The machine learning models used include a probabilistic circuit model for generating a generative model of the environment or system and an ARF model for identifying anomalies based on the generative model.

The present invention provides a novel approach for enhancing the reliability and trustworthiness of AI-driven cyber-physical systems by integrating and verifying data from multiple sensors using advanced machine learning techniques. This increased reliability and transparency can help accelerate the adoption of AI technologies in critical applications where safety and security are paramount.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 3 illustrates the recursive machine learning modeling equations employed by the data processing unit 130 for analyzing the collected real-time data from the plurality of sensors.

DETAILED DESCRIPTION

Figure 1A:
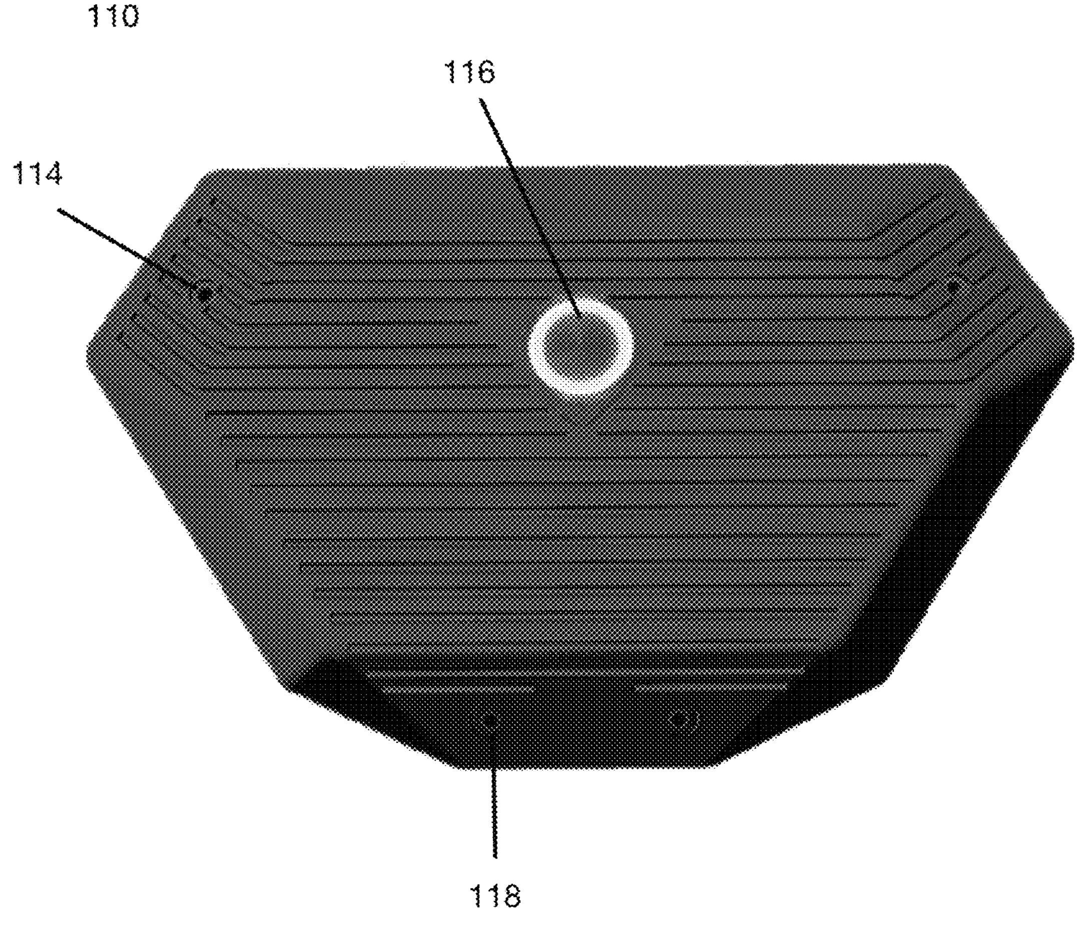
FIGS. 1A and 1B illustrate hardware and software embodiments of a system for enhancing reliability and trustworthiness in cyber-physical systems.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms “a” and “an” and “the” and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, “such as”) provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to “an element” can include two or more such elements unless the context indicates otherwise.

As used herein, the terms “optional” or “optionally” mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, “can,” “could,” “might”, or “may” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Figure 1B:
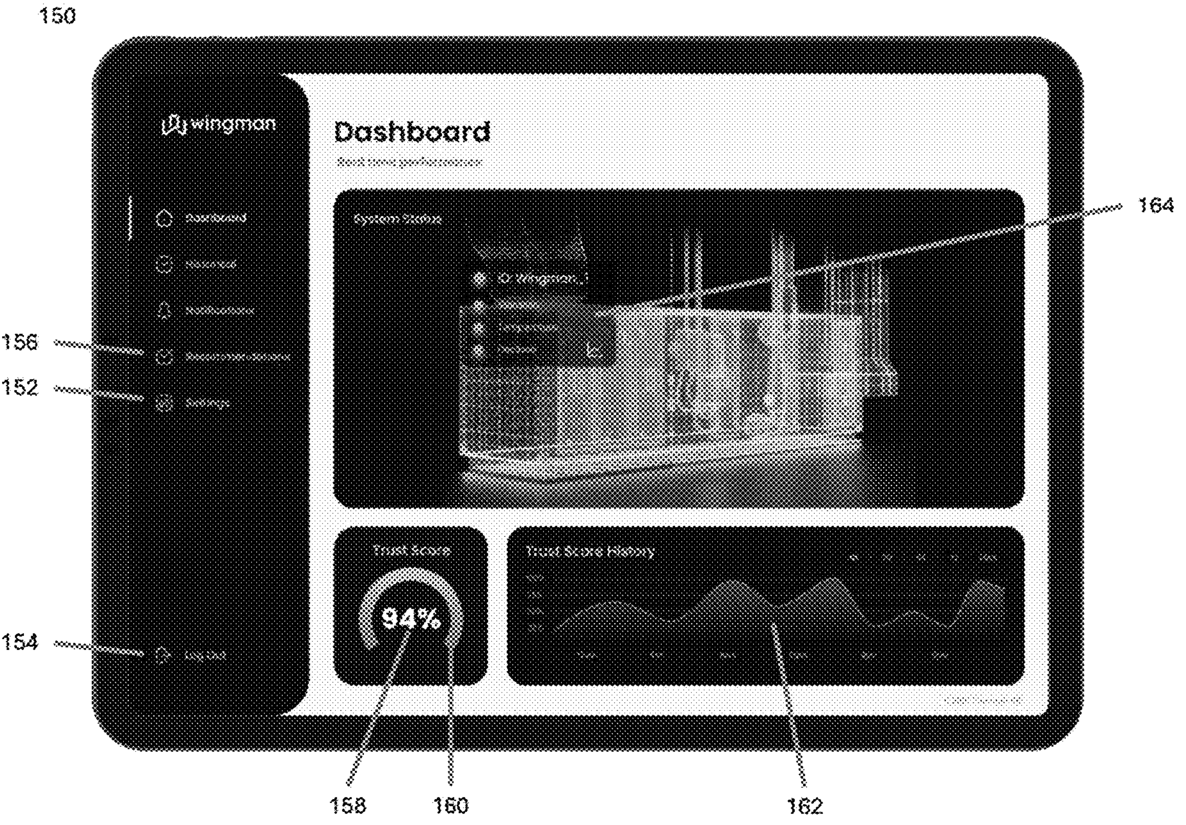

FIG. 1 illustrates an embodiment of a system 100 for enhancing reliability and trustworthiness in cyber-physical systems. The system 100 includes a mountable device 110, as shown in FIG. 1*a*, and a user interface dashboard 150, as depicted in FIG. 1*b*.

Referring to FIG. 1*a*, the mountable device 110 comprises a plurality of sensors 112 configured to collect real-time data from an environment or system. The plurality of sensors 112 includes at least two sensor types selected from the group consisting of thermal sensors 114, vibration sensors 116, acoustic sensors 118, and environmental sensors 120. The thermal sensors 114 may include thermocouples, resistance temperature detectors (RTDs), or infrared sensors for measuring temperature. The vibration sensor 116 may include accelerometers or piezoelectric sensors for detecting vibrations. The acoustic sensors 118 may include microphones or piezoelectric sensors for detecting sound waves. The environmental sensors 120 may include humidity sensors, pressure sensors, or gas detectors for monitoring ambient conditions.

In some embodiments the mountable device 110 further includes one or more processors and a memory. The memory stores instructions that, when executed by the one or more processors, cause the processor to perform various operations. These operations include receiving collected real-time data from the plurality of sensors.

The thermal sensors 114 may comprise thermocouples for detecting temperature differences through voltage generation, infrared sensors for measuring temperature from emitted infrared radiation, or thermistors for monitoring temperature changes through resistance variations. The vibration sensors 116 may comprise accelerometers or piezoelectric transducers configured to detect vibrations. The acoustic sensors 118 may comprise microphones or piezoelectric transducers configured to detect sound waves in the environment. In one embodiment, the acoustic sensors 118 use a microelectromechanical systems (MEMS) microphone, which consists of a pressure-sensitive diaphragm etched on a silicon wafer. Similarly, the vibration sensors 116 use a MEMS accelerometer, which consists of a proof mass suspended by springs on a silicon wafer. The MEMS microphone converts sound pressure into capacitance changes, while the MEMS accelerometer converts acceleration forces into capacitance changes. In both cases, the capacitance changes are converted into voltage changes by a built-in preamplifier. The voltage signals are digitized by an ADC and transmitted to the data processing unit 130 via the LPWAN 142

The environmental sensors 120 may include humidity sensors, pressure sensors, gas sensors, or particulate matter sensors. In one embodiment, the humidity sensor is a capacitive humidity sensor that consists of a hygroscopic dielectric material sandwiched between two electrodes. The dielectric constant of the hygroscopic material changes with humidity, causing a change in the capacitance between the electrodes. The capacitance change is converted into a voltage change by a signal conditioning circuit and then digitized by an ADC before being transmitted to the data processing unit 130.

Figure 2:
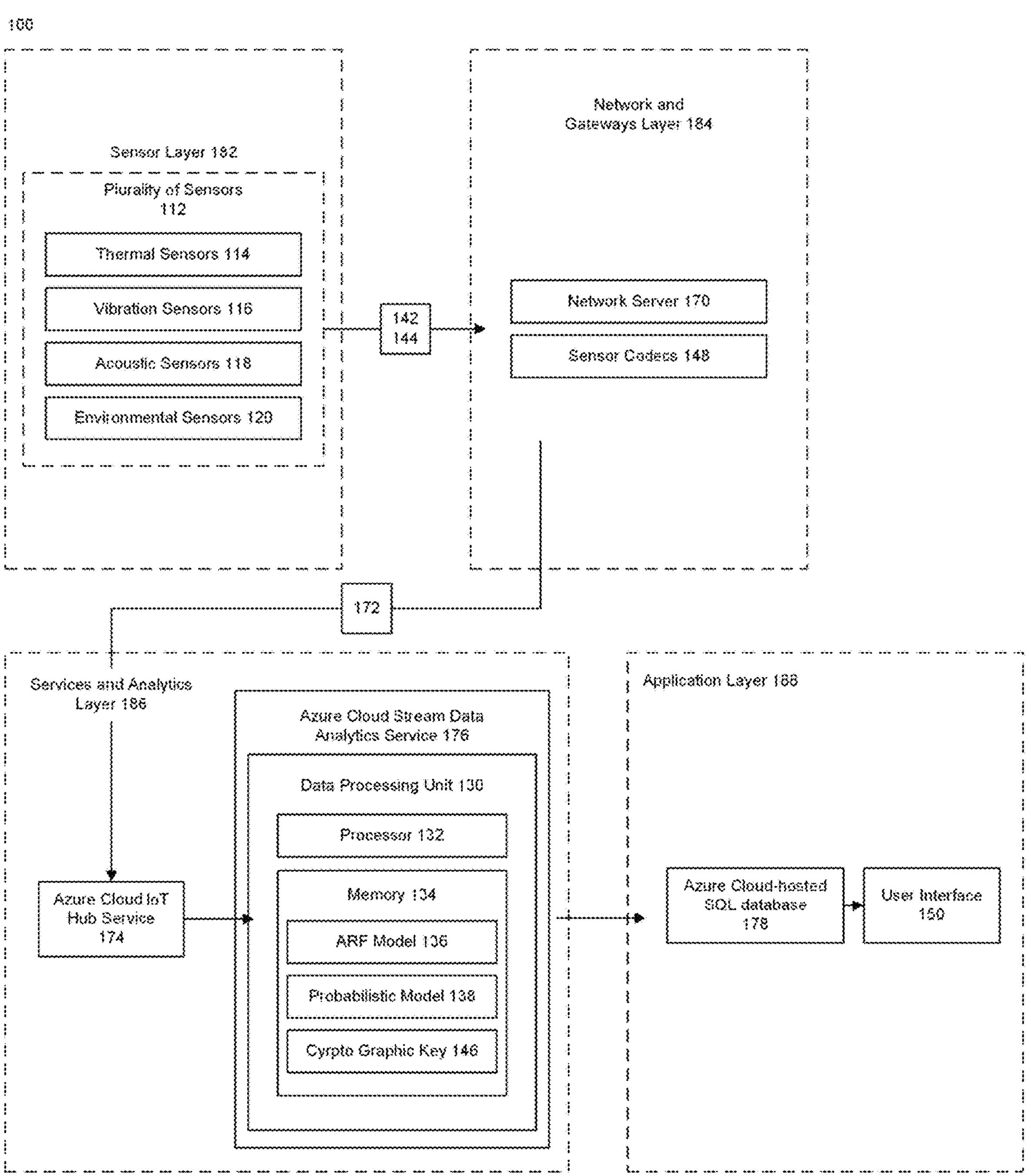
FIG. 2 is an embodiment of a system diagram illustrating the data flow and components of an exemplary embodiment of the system for enhancing reliability and trustworthiness in cyber-physical systems.

The mountable device 110 also includes a communication module (not shown) configured to transmit the data collected from the plurality of sensors 112 to a network server (further detailed in FIG. 2). The communication module (not shown) may utilize wired or wireless communication protocols, such as Ethernet, Wi-Fi, or Bluetooth.

Turning to FIG. 1*b*, the user interface dashboard 150 provides a graphical display for presenting information and receiving user input. The dashboard 150 includes a settings button 152 that allows the end-user to configure various aspects of the system 100, such as sensor thresholds, notification preferences, or data visualization options. A logout button 154 is provided to securely log out of the dashboard 150.

The dashboard 150 displays a system status indicator 164 that provides real-time information about the operational state of the cyber-physical system. This may include the current operating mode, any detected faults or warnings, or the overall health of the system.

A trust score 158 is prominently displayed on the dashboard 150, indicating the level of reliability and trustworthiness of the cyber-physical system based on the cross-validated analysis performed by the data processing unit. The trust score 158 is accompanied by a visual indicator 160, such as a color-coded gauge or meter, to provide a quick and intuitive representation of the system's trustworthiness.

The dashboard 150 also includes a chart 162 that tracks the trust score over time. The chart 162 allows the end-user to view the trust score trend over a selected time period, such as a day, week, month, or year. The chart 162 displays the trust score percentages along the y-axis and the time intervals along the x-axis, enabling the end-user to identify patterns or fluctuations in the system's reliability.

Furthermore, the dashboard 150 may display one or more statuses and recommendations 156 generated by the data processing unit 130 based on the cross-validated analysis. These recommendations aim to improve the operation of the cyber-physical system and may include suggestions for sensor calibration, maintenance schedules, or process optimizations.

The end-user can provide input or feedback through the dashboard 150, which is then transmitted back to the data processing unit 130 via the communication module. The data processing unit 130 can utilize this feedback to refine the machine learning models and improve the accuracy and relevance of future recommendations.

In addition to the recommendations 156, the dashboard 150 may display notifications (not shown) regarding the identified faults in the monitored equipment. If the data processing unit 130 detects any anomalies or issues based on the cross-validated analysis, it generates notifications that explain the nature of the fault, such as automation errors, operator errors, or sensor malfunctions. These notifications provide detailed insights into the specific problems occurring within the monitored system, enabling the end-user to take targeted corrective actions. The notifications are transmitted to the dashboard 150 via the communication module and displayed prominently to the end-user for prompt attention and resolution.

In one embodiment, the user interface 150 is a web-based dashboard that displays real-time sensor data and analytics results to the end-user. The dashboard may include visualizations such as charts, graphs, and heat maps to help the user interpret the data and identify trends and anomalies. The dashboard may also allow the user to configure alerts and notifications based on predefined thresholds or machine learning model outputs.

In one embodiment, the data processing unit 130 implements a consensus-building AI model that combines inputs from all sensors to learn and understand normal operating conditions in an unsupervised and adaptive manner. This approach enables the system to establish a baseline for normal operations, taking into account the complex interactions and dependencies between various sensor inputs.

The consensus-building AI model employed by the data processing unit 130 not only detects anomalies but also identifies and mitigates the effects of operator errors and cyber attacks on the operational technology (OT) systems. By analyzing patterns and correlations across multiple sensor inputs, the AI model can distinguish between genuine anomalies caused by equipment faults or process deviations and anomalies induced by human error or malicious activities. When an operator error or cyber attack is detected, the system generates targeted alerts and recommendations to guide the end-user in implementing appropriate corrective measures, such as reverting to safe operating conditions, isolating affected components, or initiating incident response protocols. This capability enhances the overall resilience and security of the cyber-physical system, ensuring its continued reliable operation in the face of both accidental and intentional disruptions.

FIG. 2 is a system diagram illustrating the data flow and components of an embodiment of the system 100 for enhancing reliability and trustworthiness in cyber-physical systems. The system 100 comprises a plurality of sensors 112 configured to collect real-time data from an environment or system. The plurality of sensors 112 includes at least two sensor types selected from the group comprising, thermal sensors 114, vibration sensors 116, acoustic sensors 118, and environmental sensors 120.

The plurality of sensors 112 are configured to communicate with a data processing unit 130 using a Low Power Wide Area Network (LPWAN) 142 communication protocol, such as LoRa (Long Range) 144 operating in the US 902-923 MHz frequency band. The sensors transmit the collected real-time data to the data processing unit 130 via the Low Power Wide Area Network (LPWAN) 142 using a binary message payload, for example, 0x01354AF867.

In another embodiment, the LPWAN 142 uses a Sigfox protocol instead of LoRa 144. Sigfox operates in the 868 MHz frequency band in Europe and the 902 MHz frequency band in the US. It uses ultra-narrowband modulation to transmit small data packets over long distances with low power consumption. The maximum payload size for Sigfox is 12 bytes uplink and 8 bytes downlink, compared to LoRa's maximum payload size of 243 bytes.

The data processing unit 130 comprises one or more processors 132 and a memory 134. The memory 134 stores instructions that, when executed by the one or more processors 132, cause the data processing unit 130 to receive the collected real-time data from the plurality of sensors, analyze the data using a plurality of machine learning models to identify patterns and detect anomalies, cross-validate the analysis results, and generate recommendations for improving the operation of the cyber-physical system 100.

The plurality of machine learning models includes an adversarial random forest (ARF) model 136 and a probabilistic circuit model 138. The probabilistic circuit model 138 is used to generate a generative model of the environment based on the collected real-time data, while the ARF model 136 identifies anomalies in the collected data based on the generative model.

The data processing unit 130 may use additional machine learning models besides the ARF model 136 and the probabilistic circuit model 138. For example, it may use a convolutional neural network (CNN) to analyze image data from the vibration sensors 116, or a recurrent neural network (RNN) to analyze time-series data from the acoustic sensors 118. The choice of machine learning model depends on the type and complexity of the sensor data being analyzed.

The data processing unit 130 encrypts the collected real-time data using a cryptographic key 146 before transmitting the data for analysis and decrypts the encrypted data using the same cryptographic key 146 before analyzing the data using the machine learning models 136, 138.

The data flow in the system 100 starts in the sensor layer 182, where the environmental sensors 120 collect real-time data. The data is then transmitted from the sensor layer to the network and gateways layer via the LoRa LPWAN protocol. In the network and gateway layer, sensor codecs 148 and an Actility LoRaWAN Network Server 170 receive the binary message payload.

The Network and Gateways Layer 184 outputs an MQTT backhaul 172 in the form of decoded JSON-formatted sensor telemetry to the Services and Analytics Layer 186 in the Azure cloud. The Azure Cloud IoT Hub Service 174 receives the MQTT backhaul and sends it as input to the Azure Cloud Stream Data Analytics Service 176 which hosts the data processing unit 130. The data processing unit 130 processes the MQTT backhaul 172 into queries and outputs internal cloud message routing in the application.

In the Application Layer 188, the processed data is sent to the Azure Cloud-hosted SQL database 178 and then to the user interface 150 for presentation to the end-user, along with the generated recommendations 156 for improving the operation of the cyber-physical system 100.

The system 100 may also include actuators (not shown) that can be controlled by the data processing unit 130 based on the analysis results and recommendations 156. For example, if the machine learning models detect an anomaly in the temperature data from the thermal sensors 114, vibration sensors 116, the data processing unit 130 may send a command to an actuator to adjust the temperature setpoint of an HVAC system. The actuators may be connected to the data processing unit 130 via the same LPWAN 142 used by the sensors 112, or via a separate wired or wireless network.

FIG. 3 illustrates an embodiment of the recursive machine learning modeling equations employed by the data processing unit 130 for analyzing the collected real-time data from the plurality of sensors. The modeling equations are used to generate a generative model of the environment or system and identify anomalies in the collected data.

In some embodiments the recursive machine learning modeling equations include three types of nodes: input nodes 302, sum nodes 304, and product nodes 306. Each node computes a specific function based on its type and the functions computed by its child nodes.

For an input node v 302, the function p_v(x) is computed as f_v(x), where f_v(x) is a function specific to the input node v. This function may be a convolutional neural network (CNN) model trained to identify patterns in image data collected by vibration sensors 116.

For a sum node v 304, the function p_v(x) is computed as the weighted sum of functions p_c(x) computed by each child node c of v. The weights w_vc are associated with the edges connecting node v to its child nodes. This computation is represented by the equation:

$$\text{p\_v}(x) = \text{Sum}(\text{w\_vc}^*\text{p\_c}(x) \text{ for each } c \text{ in children of } v)$$

For a product node v (306), the function p_v(x) is computed as the product of functions p_c(x) computed by each child node c of v. This computation is represented by the equation:

$$\text{p\_v}(x) = \text{Product}(\text{p\_c}(x) \text{ for each } c \text{ in children of } v)$$

The recursive nature of these equations allows for the generation of a complex generative model of the environment or system based on the collected real-time data. This generative model, created using a probabilistic circuit model 138, is then used by an adversarial random forest (ARF) model 136 to identify anomalies in the collected data.

The ARF model 136 trains a plurality of decision trees using different subsets of the collected real-time data. An anomaly score is computed for each data point based on the proportion of decision trees that classify the data point as an anomaly. Data points with anomaly scores exceeding a predetermined threshold are identified as anomalies.

The machine learning models analyze data from multiple sensors to detect inconsistencies and anomalies in the physical operations of the system. The data processing unit cross-validates the detected anomalies by comparing the results across different types of sensors, helping to rule out false positives. This cross-validation process involves comparing the timestamps, duration, and severity of the anomalies detected by each sensor and applying a set of predefined rules to determine if the anomaly is genuine. The rules take into account factors such as the agreement between sensors, historical patterns, and the physical properties of the system being monitored. When inconsistencies or anomalies are confirmed, the machine learning models are manually retrained using the validated data to improve their accuracy and reliability in detecting genuine issues. The retraining process involves updating the model parameters, adjusting the feature weights, and fine-tuning the hyperparameters based on the characteristics of the validated anomalies.

The system 100 may also generate a sensor fusion model that combines the collected real-time data from the plurality of sensors. This sensor fusion model is used in the analysis to further improve the accuracy and reliability of anomaly detection.

Based on the cross-validated analysis, the data processing unit 130 generates one or more recommendations 156 for improving the operation of the cyber-physical system or AI system. These recommendations may include adjustments to operating parameters and estimates of the expected improvement resulting from each adjustment.

The user interface 150 displays the generated recommendations 156 to an end-user and receives feedback regarding the recommendations. This feedback is used to update the machine learning models and improve future recommendations.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

What is claimed is:

1. A system for enhancing reliability and trustworthiness in a cyber-physical system, the system comprising:

a plurality of sensors configured to collect real-time data from an environment or system, wherein the plurality of sensors includes at least two sensor types selected from the group consisting of vibration sensors, thermal sensors, acoustic sensors, and environmental sensors;

a data processing unit comprising one or more processors and a memory, the memory storing instructions that, when executed by the one or more processors, cause the data processing unit to:

receive, from the plurality of sensors, collected real-time data;

analyze the collected real-time data using a probabilistic circuit model having input nodes, sum nodes, and product nodes to generate, as a generative model of the environment or system, a probability value indicative of a joint probability distribution over the collected real-time data, wherein (i) input nodes implement node-specific functions of sensor data associated with respective sensor types, (ii) sum nodes compute weighted sums of functions of child nodes that correspond to same-type sensors, and (iii) product nodes compute products of functions of child nodes that correspond to different sensor types;

sequentially input the probability value generated by the probabilistic circuit model, as a sole input feature or as part of a reduced set of probabilistic features derived from the generative model, into an adversarial random forest (ARF) model that is distinct from the probabilistic circuit model;

analyze the collected real-time data using a plurality of machine learning models to identify patterns and detect anomalies, wherein the plurality of machine learning models comprises an ARF model and a probabilistic circuit model; and cross-validate the analysis results across the collected real-time data from the plurality of sensors to verify the accuracy and reliability of the analysis and generate, based on the cross-validated analysis, and based on a consensus decision rule implemented by the data processing unit, one or more recommendations for improving the operation of the cyber-physical system, the consensus decision rule determining that a detected anomaly is a consistent anomaly only when (i) the probability value falls below a first predetermined probability threshold that indicates inconsistency between the collected real-time data and the generative model, and (ii) an anomaly score generated by the ARF model for the probability value simultaneously exceeds a second predetermined anomaly threshold that indicates that at least a threshold proportion of decision trees of the ARF model classify the probability value as anomalous and a communication interface configured to transmit the one or more recommendations and a trust score indicating a level of reliability and trustworthiness of the cyber-physical system to a user interface for presentation to an end-user.

2. The system of claim 1, wherein the probabilistic circuit model comprises input nodes having node-specific functions that include a convolutional neural network (CNN) model trained to identify patterns in image data collected by the vibration sensors, and wherein outputs of the CNN model at the input nodes are propagated through the sum nodes and product nodes of the probabilistic circuit model as part of the generative model.

3. The system of claim 1, wherein the instructions further cause the data processing unit to:

determine a trust score indicating a level of reliability and trustworthiness of the cyber-physical system based on the cross-validated analysis and transmit the trust score to the user interface for presentation to the end-user;

compute the trust score based at least in part on a measure of consistency between (i) the probability value generated by the probabilistic circuit model and (ii) the anomaly score generated by the ARF model, such that the trust score decreases when anomalies identified by the ARF model are not corroborated by the generative model of the probabilistic circuit model or by cross-validation across different sensor types; and generate, based on the trust score, a maintenance recommendation flagged with a high-reliability indication on the user interface when the trust score exceeds a trustworthiness threshold and the cross-validated analysis does not indicate any consistent anomaly.

4. The system of claim 3, wherein the instructions further cause the data processing unit to:

track the trust score over time; and generate a visualization of the trust score over a selected time for display on the user interface;

wherein tracking the trust score over time comprises maintaining the trust score as a time series, and generating the visualization comprises plotting trust score values on a y-axis against time intervals on an x-axis over a user-selected time period, and the user-selected time period is selected from among at least a day, a week, a month, and a year using the user interface.

5. The system of claim 1, wherein the environmental sensors include at least one of;

a temperature sensor;

a humidity sensor; and a water leak sensor.

6. The system of claim 1, wherein the instructions further cause the data processing unit to:

generate, using the probabilistic circuit model, a fused feature representation of the collected real-time data from the plurality of sensors by combining outputs of input nodes associated with different sensor types through the product nodes and sum nodes of the probabilistic circuit model; and provide the fused feature representation as part of the reduced set of probabilistic features that are sequentially input into the ARF model for anomaly score computation, thereby using the probabilistic circuit model as a sensor fusion model that improves accuracy and reliability of anomaly detection by the ARF model.

7. The system of claim 1, wherein the communication interface is further configured to receive feedback from the end-user regarding the one or more recommendations and transmit the feedback to the data processing unit, and wherein the instructions further cause the data processing unit to refine the plurality of machine learning models based on the feedback.

8. The system of claim 1, wherein the instructions further cause the data processing unit to:

identify, based on the cross-validated analysis, one or more systems being monitored by the plurality of sensors that are not functioning normally; and generate a notification recommending maintenance or replacement of the identified one or more systems.

9. The system of claim 1, wherein the instructions further cause the data processing unit to:

encrypt the collected real-time data using a cryptographic key before transmitting the data for analysis; and decrypt the encrypted data using the cryptographic key before analyzing the data using the plurality of machine learning models.

10. The system of claim 1, wherein the plurality of sensors are configured to communicate with the data processing unit using a low-power wide-area network (LPWAN) communication protocol.

11. A computer-implemented method for enhancing reliability and trustworthiness in a cyber-physical system, the method comprising:

collecting, using a plurality of sensors mounted on or proximate to equipment of the cyber-physical system, real-time data from an environment or system, the plurality of sensors including at least two sensor types selected from vibration sensors, thermal sensors, acoustic sensors, and environmental sensors;

receiving, by a data processing unit comprising one or more processors and a memory, the collected real-time data from the plurality of sensors via a low-power wide-area network (LPWAN) using a binary message payload;

analyzing, by the data processing unit, the collected real-time data using a probabilistic circuit model having input nodes, sum nodes, and product nodes to generate a generative model of the environment or system, the probabilistic circuit model outputting a probability value indicative of a joint probability distribution over the collected real-time data, wherein (i) input nodes implement node-specific functions of sensor data associated with respective sensor types, (ii) sum nodes compute weighted sums of functions of child nodes that correspond to same-type sensors, and (iii) product nodes compute products of functions of child nodes that correspond to different sensor types;

sequentially inputting, by the data processing unit, the probability value, as a sole input feature or as part of a reduced set of probabilistic features derived from the generative model, into an adversarial random forest (ARF) model distinct from the probabilistic circuit model;

determining, via the ARF model, an anomaly score for the probability value by evaluating the probability value against a plurality of decision trees trained using different subsets of the collected real-time data and computing an anomaly score based on a proportion of the decision trees that classify the probability value as an anomaly;

cross-validating the detected anomalies by comparing the anomaly score from the ARF model with the probability value from the probabilistic circuit model to determine if the anomalies are confirmed by the generative model, where the cross-validating includes checking for agreement across the at least two sensor types using metrics including timestamp alignment within a predefined window, duration of the anomaly, and correlations between sensor data pairs;

cross-validating the consistent anomaly by comparing, according to predefined rules, the consistent anomaly across different sensor types based on at least one of the timestamps, duration, and severity, to verify that the consistent anomaly reflects a genuine issue in physical operation of the cyber-physical system;

generating, by the data processing unit and based on the cross-validated analysis, one or more recommendations for improving the system and a trust score indicating a level of reliability and trustworthiness of the cyber-physical system;

transmitting, via a communication interface, the one or more recommendations and the trust score to a user interface; and displaying, on the user interface, the one or more recommendations and the trust score to an end-user.

12. The method of claim 11, wherein the plurality of sensors comprises at least one of a vibration sensor, a sound sensor, a temperature sensor, a humidity sensor, and a water leak sensor.

13. The method of claim 11, wherein the collected real-time data is transmitted from the plurality of sensors to the data processing unit via a Low Power Wide Area Network (LPWAN) using a binary message payload.

14. The method of claim 13, wherein the LPWAN utilizes a LoRa (Long Range) wireless communication protocol operating in the US 902-923 MHz frequency band.

15. The method of claim 11, wherein the data processing unit comprises a cloud-based computing platform that includes a Message Queuing Telemetry Transport (MQTT) service for receiving the collected real-time data and a stream data analytics service for processing the received data.

16. The method of claim 11, wherein the probabilistic circuit model generates the generative model by:

computing, at each input node, a function specific to the input node;

computing, at each sum node, a weighted sum of functions computed by child nodes; and computing, at each product node, a product of functions computed by child nodes.

17. The method of claim 11, wherein the ARF model identifies anomalies by:

training a plurality of decision trees using different subsets of the collected real-time data; computing an anomaly score for each data point based on the proportion of decision trees that classify the data point as an anomaly; and identifying data points with anomaly scores exceeding a predetermined threshold as anomalies.

18. The method of claim 11, wherein cross-validating the analysis results comprises:

comparing the identified patterns and detected anomalies across different types of sensors; and adjusting the machine learning model based on inconsistencies detected during the comparison.

19. The method of claim 11, wherein generating the one or more recommendations comprises:

identifying, based on the cross-validated analysis, one or more adjustments to operating parameters of the system; and estimating an expected improvement in the operation of the system resulting from each adjustment.

20. The method of claim 11, further comprising:

receiving, via the user interface, feedback from the end-user regarding the one or more recommendations; and updating the machine learning model based on the received feedback to improve future recommendations.

* * * * *